Patented July 21, 1931

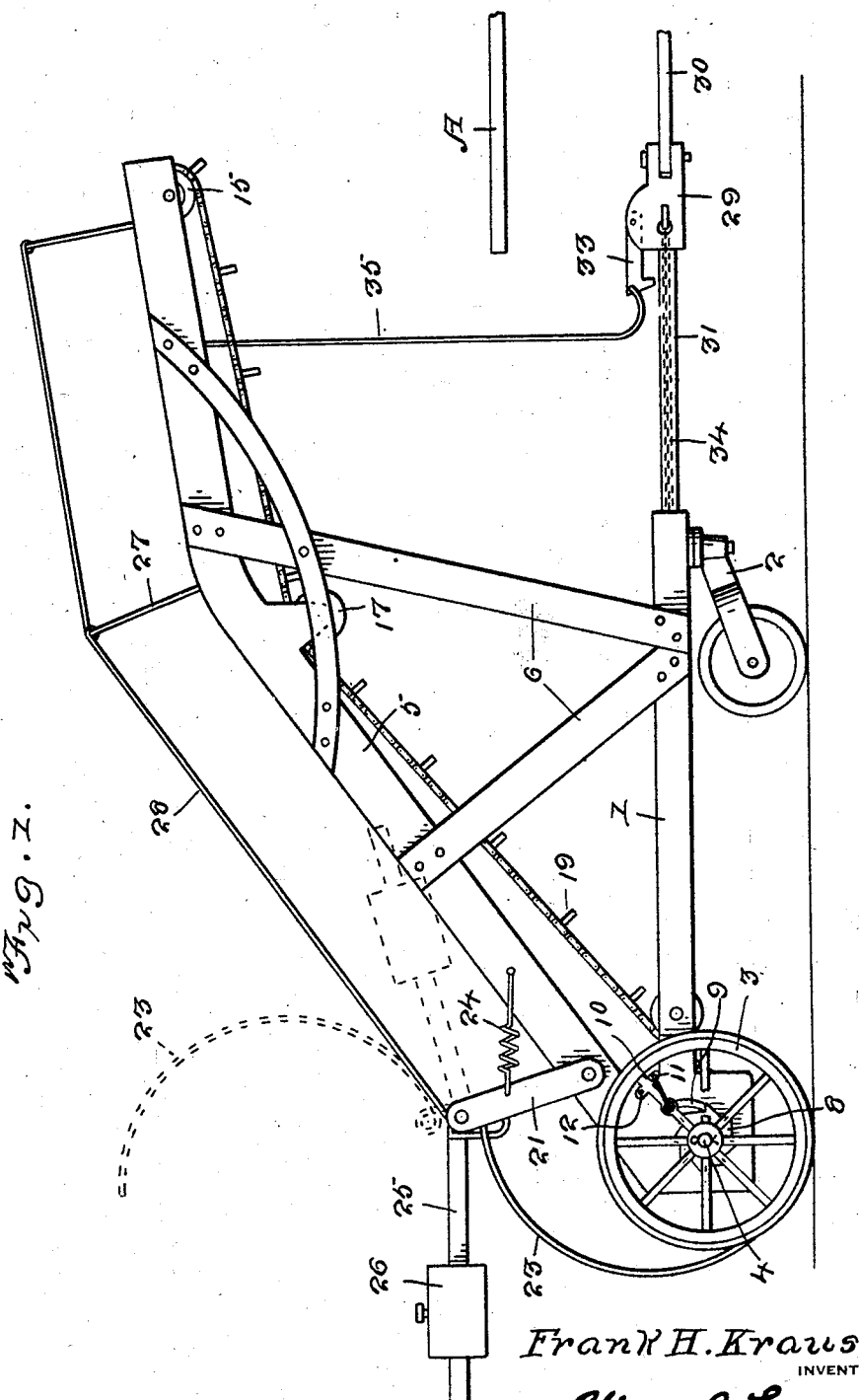

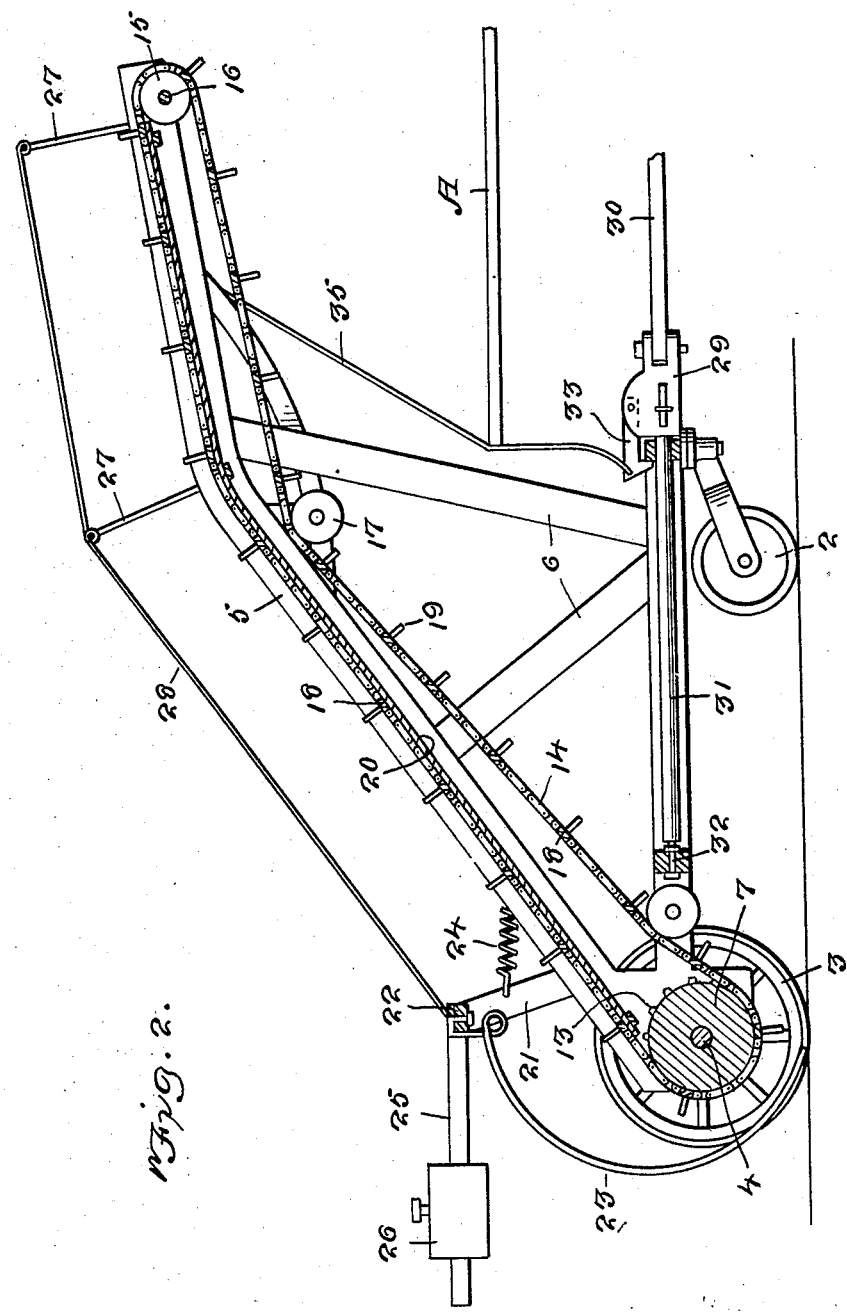

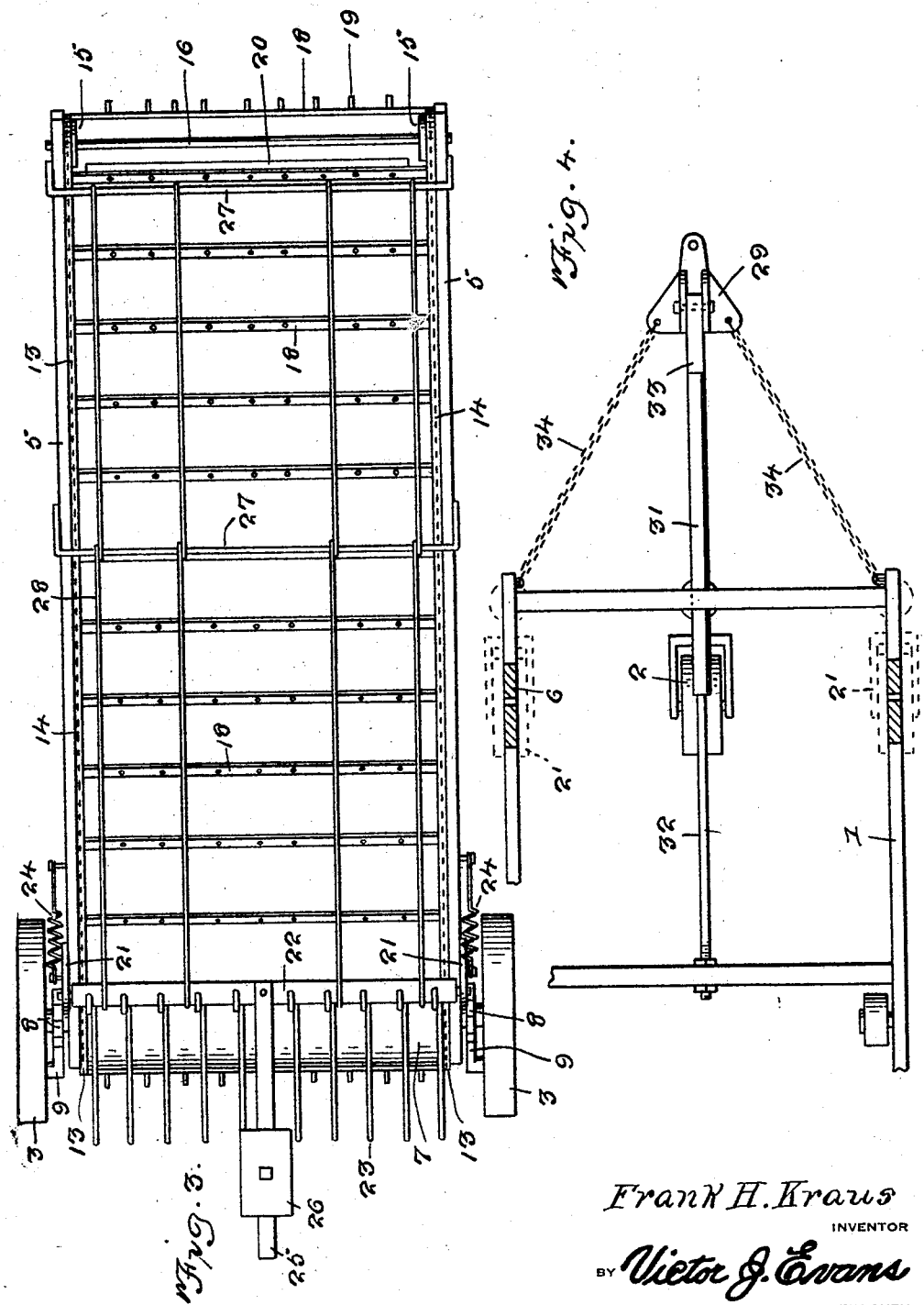

1,815,780

UNITED STATES PATENT OFFICE

FRANK H. KRAUS, OF WISCONSIN RAPIDS, WISCONSIN

LOADER

Application filed June 8, 1928. Serial No. 283,904.

This invention relates to a loader for hay and other material, the general object of the invention being to provide a wheeled frame having an extensible draw bar adapted to be connected with the rear part of a wagon or the like so that the material can be delivered into different parts of the wagon, with a conveyor driven from some of the ground wheels for receiving the material from a rake and conveying it to the wagon.

Another object of the invention is to provide means for preventing the material on the conveyor from being blown therefrom by the wind and also to provide means for connecting the conveyor to the ground wheels and disconnecting it therefrom.

A further object of the invention is to provide spring means for permitting yielding movement of the rake and to provide means for moving the rake into inoperative position whenever desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention, with the draw bar in extended position.

Figure 2 is a vertical sectional view with the draw bar in its rear position.

Figure 3 is a top plan view.

Figure 4 is a plan view with parts in section, showing the arrangement of the draw bar and also showing caster wheels at the sides of the frame, these wheels being shown in dotted lines.

In these views, the numeral 1 indicates a frame which is supported at its front by the caster wheel 2 and at its rear by the wheels 3 which are rotatably mounted on the axle 4. A conveyor frame 5 has its lower end suitably connected with the rear end of the frame 1 and braces 6 support the upper part of the frame 5 from the front part of the frame 1. A drum 7 is carried by the axle 4 and has ratchet wheels 8 at its ends, each of which is engaged by a pawl 9 carried by each wheel 3, a spring 10 being connected with the pivot of each pawl and said spring is held in either one of two positions by a pin 11 engaging either one of a pair of holes on a bracket 12 attached to each wheel 3 so as to hold the pawl in either operative or inoperative position. Thus the drum can be released from the wheels whenever desired by moving the pawls out of engagement with the ratchet wheels. The drum is provided with the sprockets 13, one adjacent each end thereof, and the conveyor frames 14 pass over these sprockets and over the pulleys 15 carried by a shaft 16 journaled in the front end of the conveyor frame. Guiding pulleys 17 are provided for guiding the lower reaches of the chains. The usual cross strips 18 have their ends connected with the chains and these strips carry the projections 19. The bottom plate of the conveyor frame is shown at 20.

Arms 21 are pivotally connected with the sides of the conveyor frame, adjacent the lower end thereof, and a rake bar 22 has its ends pivotally arranged in the upper ends of the arms, the teeth of the rake being shown at 23. Springs 24 connect the arms with the sides of the conveyor frame and tend to pull the rake forwardly. This arrangement permits the rake to adjust itself to the load.

A rearwardly extending arm 25 is connected with the bar 22 at the center thereof and a weight 26 is adjustably connected with the arm 25 to hold the rake in operative position. When not in use, the rake can be swung upwardly into inoperative position, as shown in dotted lines in Figure 1, and the weighted arm will hold the parts in this position.

Yoke members 27 are fastened to the upper part of the conveyor frame and extend over the conveyor and cables 28 are connected with these members and with the rake bar 22 and act to hold the material on the conveyor as it is being drawn along the same by the strips 18 and their projections 19. These cables also act to prevent the material from being blown from the conveyor by the wind.

The draw head 29, which is adapted to be connected with a wagon or the like by the link 30, is connected with a tubular bar 31 which is slidably arranged in the front part of the frame 1 and is guided in its movement through means of a rod 32 which has its rear end connected with the rear part of the frame 1. A latch 33 on the head is adapted to engage the front cross piece of the frame 1 to hold the head in retracted position and the forward movement of the head is limited by the chains 34 which connect the sides of the head with the side bars of the frame 1. Thus when it is desired to cause the material dropping from the conveyor to enter the forward part of the wagon, a portion of which is shown at A in Figures 1 and 2, the head is shoved back and held in this position by the latch so that the conveyor will project a considerable distance over the body, as shown in Figure 2, but when the material is to be dumped into the rear part of the wagon, a cable 35 is pulled upon to raise the latch so that the head can move to its forward position, as shown in Figures 1 and 4, thus increasing the space between the loader and the wagon.

I provide an extra caster wheel 2' so that the one wheel can be placed at one side of the frame 1 and the other at the opposite side thereof, as shown in dotted lines in Figure 4. This arrangement is preferable when the loader is being used for bundles of fodder or the like, as in this case, the wheels will not pass over the bundles, as the single wheel placed at the center would. The use of two wheels is also preferable where the ground is soft and the single wheel would press the hay or other material into the ground.

From the foregoing it will be seen that as the device moves along, the rake will gather the material from the ground and the conveyor means will take the material from the rake and carry it up the device and drop it into the wagon or other vehicle to which the loader is attached.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is—

1. A loader comprising a frame, an axle at the rear of the frame, wheels rotatably mounted on the ends of the axle, a drum connected with the axle, ratchet means for conecting the ends of the drums with the wheels, sprockets connected with the drum, chains passing over he sprockets, guiding means for the chains on the frame, strips having projections thereon connected with the chains, an arm pivoted to each side of the frame adjacent the lower end of the loader, a rake bar pivotally connected with the upper ends of the arms, rake teeth connected with the bar, forwardly extending springs connecting the arms with the frame, a rearwardly extending bar connected with the rake bar and a weight adjustably mounted on said bar.

2. A loader comprising a frame, an axle at the rear of the frame, wheels rotatably mounted on the ends of the axle, a drum connected with the axle, ratchet means for connecting the ends of the drums with the wheels, sprockets connected with the drum, chains passing over the sprockets, guiding means for the chains on the frame, strips having projections thereon connected with the chains, an arm pivoted to each side of the frame adjacent the lower end of the loader, a rake bar pivotally connected with the upper ends of the arms, rake teeth connected with the bar, forwardly extending springs connecting the arms with the frame, a rearwardly extending bar connected with the rake bar, a weight adjustably mounted on said bar, yokes extending upwardly from the sides of the frame and bridging the conveyor and cables passing over the bights of said yokes and having their lower ends connected with the rake bar.

In testimony whereof I affix my signature.

FRANK H. KRAUS.